(12) United States Patent
Airhart

(10) Patent No.: US 7,741,993 B1
(45) Date of Patent: Jun. 22, 2010

(54) METHOD FOR LOCATING THE SURFACE OF A POLYMER PARTICLE BED

(75) Inventor: Chad M. Airhart, Edna, TX (US)

(73) Assignee: Equistar Chemicals, LP, Houston, TX (US)

( * ) Notice: Subject to any disclaimer, the term of this patent is extended or adjusted under 35 U.S.C. 154(b) by 0 days.

(21) Appl. No.: 12/462,021

(22) Filed: Jul. 28, 2009

(51) Int. Cl.
*G01S 13/08* (2006.01)

(52) U.S. Cl. ...................................... 342/124; 342/175

(58) Field of Classification Search ................. 342/124, 342/175
See application file for complete search history.

(56) References Cited

U.S. PATENT DOCUMENTS

| 5,136,299 | A | * | 8/1992 | Edvardsson | ................. | 342/124 |
| 6,825,798 | B2 | * | 11/2004 | McGregor | ................. | 342/124 |
| 7,259,712 | B1 | * | 8/2007 | McKeen et al. | ............. | 342/124 |
| 2003/0169197 | A1 | * | 9/2003 | McGregor | ................. | 342/124 |
| 2007/0008212 | A1 | * | 1/2007 | Serban et al. | ............... | 342/124 |

* cited by examiner

*Primary Examiner*—John B Sotomayor

(57) ABSTRACT

A method for determining the level of a bed of polymer particles in a vessel comprising providing water wet polymer particles and employing a guided wave radar probe unit carrying a pair of radar active probes spaced from the guided wave radar probe unit by a radar inactive member, and positioning the radar inactive member so that polymer particles that are introduced into the vessel first encounter the radar inactive member.

5 Claims, 1 Drawing Sheet

METHOD FOR LOCATING THE SURFACE OF A POLYMER PARTICLE BED

BACKGROUND OF THE INVENTION

1. Field of the Invention

This invention relates to a method for detecting in a vessel the surface level of a bed of polymer particles, such as polyethylene pellets.

2. Description of the Prior Art

Although this invention is described hereinafter, for sake of clarity and brevity, in respect of polyethylene particles, it is applicable to polymer particles that have similar dielectric constant values.

Heretofore, polyethylene has been formed by polymerizing ethylene while dissolved in a solvent such as hexane. The resulting single liquid phase solvent solution (solution or single phase solution) also contains a polymerization catalyst. The polymerization reaction is carried out in the single liquid phase containing at least ethylene and catalyst dissolved in a solvent. Optionally, one or more co-monomers can be present. For sake of clarity and brevity this invention will be described in respect of polymerizing ethylene alone to form linear high density polyethylene (HDPE). However, one or more co-monomers can be employed in the practice of this invention.

The polymerization of the ethylene monomer is carried out using a series of stirred reactors followed by a tubular (plug flow) reactor. The plug flow reactor is employed upstream of an adsorber to accomplish product uniformity with a uniform residence time distribution for the reactants in that reactor. This gives all portions of that process fluid essentially uniform residence time in the reactor.

Downstream of the last (plug flow) reactor a catalyst deactivator is injected into the solution, and the resulting mixture introduced into an adsorption pressure vessel which adsorbs various compounds and decomposition components from the single phase solution. The polymerization reaction is carried out at an elevated temperature of from about 150 to about 280 degrees Centigrade (C) at a pressure of from about 2,000 to about 4,000 psig. The adsorption step of this process is also carried out in this high pressure range.

The adsorbent material used in this pressure vessel is typically a particulate material. These particles adsorb from the single phase liquid solution catalyst, various catalyst moieties, and by-products (residue) from the decomposition of the catalyst deactivator. The adsorbent is typically activated alumina particles such as alumina spheres about 1.7 millimeters in diameter.

The HDPE process must be carried out in a single phase solution. If two phases (a polymer rich phase and a separate solution rich phase) is allowed to form in the reaction zone or in the adsorption zone, a phenomenon known in the art as "frosting" or "two-phasing" occurs wherein solid polymer forms and separates out from the single phase solution. Although two-phasing is desired downstream of the reactors and adsorbers, it is not desirable in the interior of the reactors and adsorbers because solid polymer that comes out of solution and deposits in the equipment in those zones.

Process conditions such as temperature, pressure, and mass composition of the single phase solution stream can determine whether the stream will stay in the single phase or move toward two-phasing. For example, an elevated ethane content can induce two-phasing. If two-phasing is allowed to continue unchecked, the reactors, adsorbers, and/or associated equipment in which the two-phasing occurs will eventually plug up with solid polyethylene deposits thereby requiring shutdown of the plant, and cleanup of at least the affected equipment, a costly event in terms of lost production and clean-up expenses.

Downstream of the adsorption step two-phasing is deliberately induced in a separation unit. This is accomplished by way of a series of de-pressurization steps to form the desired, at this point in the process, formation of distinct polymer rich and solution rich phases. In this separation step, the polymer rich phase is physically separated from the solvent rich phase.

The separated solvent rich phase is processed to remove impurities and to separate solvent from un-reacted ethylene so that the recovered, separate solvent and un-reacted ethylene streams can be recycled to and reused in the afore described ethylene polymerization process.

The separated molten polymer rich phase is processed in an extruding/melt cutting unit to convert the molten polyethylene to a solid extrudate that is cut to form the desired solid polyethylene pellet product of the process. The solid polyethylene pellets resulting from this process are right cylindrical in shape and are about ⅛ inch in diameter and length. These pellets (particles) are surface wet with water and/or solvent.

The polyethylene pellets are then processed in a de-lumping unit to remove some water and any oversized lumps of pellets. The polyethylene pellets recovered from this unit are passed to a feed tank which holds pellet feed for a stripper unit downstream thereof.

The downstream stripper unit, known in the art as the "pellet stripper," holds in a large vessel a bed of polyethylene pellets that are surface wet with water and solvent. The pellet stripper operates to remove from that bed, by way of a counter current low pressure steam treatment, residual solvent from the polyethylene pellets residing in that vessel. A slurry of water and polymer pellets is introduced into an upper portion of the vessel. This slurry first encounters near the top of the vessel a conical strainer (screen). Water passes through the strainer and is removed from the vessel. The liquid wet polymer particles roll down the upper, downwardly inclined surface of the strainer and into the interior of the vessel to form a bed of pellets in the interior of the vessel.

After solvent stripping in the pellet stripper, the water wet polyethylene pellets are removed from the pellet stripper vessel and subjected to de-watering, drying, blending, storing, and shipping operations.

It is desirable to be able to reliably, accurately, and continuously determine the upper level of the bed of polyethylene pellets residing in the aforesaid pellet stripper vessel. This is important to the reliability of the polymer production process as a whole.

Heretofore, the level of the bed of polyethylene pellets in the pellet stripper vessel below the conical strainer was determined by what is known in the art as a Bindicator which employs a weight on a cable. The weight is lowered into the upper portion of the pellet stripper vessel until a change in tension is detected in the cable presumably by contact of the weight with the upper level of the bed of polymer particles, and that is taken as the upper bed level measurement point.

Bindicator devices were set to operate periodically and software was employed in an attempt to make the measurements represent a continuous signal since the bed level is a controlled variable in the overall process.

The Bindicator approach proved to be less than desirable from a reliability point of view. Numerous problems were experienced such as cable kinks, motor failures, lost weights resulting in downstream equipment damage, and the like.

The detection of the upper level of the polymer bed in the pellet stripper vessel by way of lasers or ultrasound equipment was determined not to be feasible because the steam environment in the vessel and the loose pellets rolling off the strainer interfered with measurements using those classes of technology.

The detection of the upper level of the polymer bed in the pellet stripper vessel by way of guided wave radar was initially thought not to be useful not only due to the falling pellets, but, more importantly, the low dielectric constant of polymers, particularly polyethylene, even more particularly high density polyethylene.

To determine the upper level of the bed of polymer particles, a guided radar pulse must reflect off of that upper level with a strong enough reflection pulse to be detected by the radar receiver. Generally, the higher the dielectric constant value of the reflection surface, the stronger the reflection pulse back to the receiver. Guided wave radar transmitting/receiving units in general have a dielectric value limit of 2.0 to 2.5 as a lower operating range whereas, for example, the dielectric value range of high density polyethylene is from about 1.6 to about 1.8.

It was thought that the combination of falling polymer particles and low dielectric constant values also made guided wave radar technology inapplicable.

However, pursuant to this invention, a combination of factors has been discovered that can make guided wave radar technology useful in the detection of the surface level of a bed of polymer particles.

SUMMARY OF THE INVENTION

This invention provides a method for determining the level of a bed of polymer particles in a vessel comprising providing water wet polymer particles and employing a guided wave radar probe unit carrying a pair of rigid radar active probes spaced from the guided wave radar probe unit by a rigid radar inactive member, and positioning the radar inactive member so that polymer particles that are introduced into the vessel first encounter the radar inactive member.

DETAILED DESCRIPTION OF THE INVENTION

Figure 1:
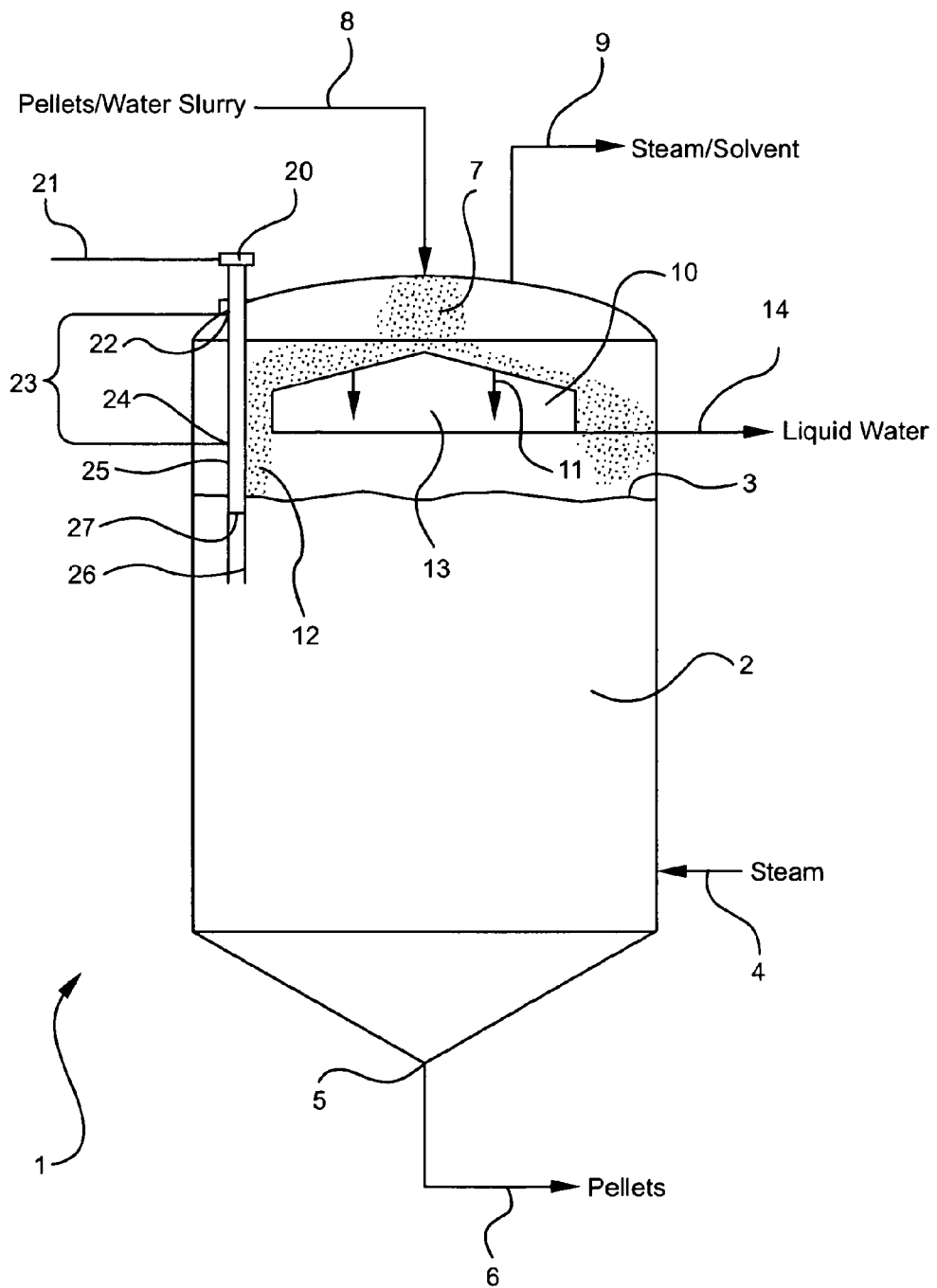
FIG. 1 shows a typical pellet stripper vessel employing a guided wave radar unit in the manner of this invention.

FIG. 1 shows a pellet stripper vessel 1 carrying internally thereof a bed of polymer pellets 2. Pellet bed 2 has an upper surface 3. Steam 4 is introduced into a lower portion of vessel 1 and rises in counter flow to the pellets which move downwardly in vessel 1 toward an outlet 5 where at a stream of pellets 6 are removed from vessel 1.

A slurry of water and pellets 7 is introduced into an upper portion of vessel 1 by way of conduit 8. A mixture of steam and solvent is removed from the top of vessel 1 by way of conduit 9.

Vessel 1 carries in an upper, internal portion thereof a conical strainer (screen) 10. Strainer 10 has apertures (not shown) distributed over its top surface that allow water 11, but not pellets 12, to flow into the interior 13 of the strainer for removal from vessel 1 by way of conduit 14. Pellets 12 are water/solvent wet on their surface and fall downwardly over the top of and past the side of strainer 10 to upper pellet surface 3.

A combination guided wave radar transmitter and receiver 20 is mounted on the roof of vessel 1 with a wire 21 attached thereto to carry output signals to a remote computer system such as a distributive control system (not shown) that is typically used to monitor and control various polymer production plant streams and processes.

Pursuant to this invention, guided wave radar transmitter and receiver 20 is connected to a first, upper end 22 of a rigid, elongate member 23 having a distal end 24. Lower, distal end 24 carries a pair of spaced apart, rigid guided wave radar probes 25 and 26 that are kept separated by spacer 27. Member 23 is deliberately made so as not to carry a radar pulse, i.e., to be radar inactive. Radar probes 25 and 26 are connected to unit 20 so that both probes are radar active, but only below distal end 24 of member 23.

In operation, pursuant to this invention, probes 25 and 26 are at least in part submerged in bed 2 below level 3 as shown in FIG. 1. In addition, radar inactive member 23 is positioned so that falling pellets 12 first encounter, e.g., laterally impact, member 23 and not probes 25 and 26. By the time falling pellets 12 reach the vicinity of probes 25 and 26, they are flowing downwardly, essentially parallel to the long axes of probes 25 and 26.

A first radar pulse is then transmitted downwardly along probes 25 and 26. When this first radar pulse contacts a media with a different dielectric constant value, i.e., surface 3, part of that first pulse is reflected. This second or reflective radar pulse is propagated upwardly along probes 25 and 26 back to the receiver in unit 20. The time difference between the initiation of the first radar pulse and the return of the reflected radar pulse is converted to a distance from which upper surface level 3 is calculated in unit 20 in a conventional manner known in the art. The intensity of the reflected pulse depends on the dielectric constant of the particles that make up bed 2. The higher the dielectric constant value, the stronger the reflection pulse will be. That is why polymer with its low dielectric constant value was not thought to be operable with guided wave radar technology.

However, it has been found by actual practice that guided wave radar technology can be made to work with polymer particle beds in pellet strippers when the combination of surface water wet polymer particles, a pair of radar active probes (twin probes), and a radar inactive member separating radar transmitter/receiver unit from the radar active probes is employed.

Radar transmitter/receiver units that employ Time Domain Reflectometry technology together with low power nano-second microwave pulses guided along a probe are known in the art and commercially available. Units such as these are commercially available from Emerson Electric Company, particularly the Rosemount brand of such units.

Radar transmitter/receiver units can be equipped with coaxial, rigid single, flexible single, rigid twin or flexible twin radar active probes. It has been found that twin, rigid probes with their smaller radar footprint are preferred in making the process of this invention operable with low dielectric constant value polymer particles.

Radar transmitter/receiver units will transmit through wire 21 a 4 to 20 milliamp signal. Thus, the output of unit 20, besides being displayed visually on the unit, can be transmitted to and displayed on a personal computer, transmitted to the distributive control system that controls the polymerization plant, and the like.

Measurements employing guided wave radar technology are virtually unaffected by temperature, pressure, vapor mixtures, density, and viscosity making them ideal for a pellet stripper application.

The length of radar inactive member 23 will vary widely depending on the size of vessel 1, strainer 10, and the like, and, therefore, is impossible to quantify. However, it will generally be at least several feet depending on how much length is necessary to prevent incoming pellets 12 from laterally impacting radar active probes 25 and 26.

The measuring range length for probes 25 and 26 is not limited except by the length of the probes themselves. The probes themselves need only be sized to extend through the full distance over which bed level 3 measurements are desired.

I claim:

1. A method for determining the upper surface level of a bed of polymer particles that are contained in a vessel, said vessel having an upper section into which incoming polymer particles are introduced, said method comprising introducing into said upper section water wet polymer particles, providing a guided wave radar probe unit comprising a combined radar pulse transmitter and reflected radar pulse receiver, said guided wave radar probe unit having fixed thereto a first end of an elongate rigid radar inactive member, said radar inactive member carrying at its distal end a pair of spaced apart rigid radar active probes, said radar active probes being spaced from said radar probe unit by said radar inactive member, immersing said radar active probes at least in part into said bed of polymer particles, positioning said radar inactive member so that said incoming polymer particles impact said radar inactive member and not said radar active probes, transmitting a first radar pulse from said guided wave radar probe unit initiating at the top of said probes and proceeding along said probes into said bed of polymer particles, receiving a reflected radar pulse generated by said first radar pulse when said first radar pulse contacts said upper surface of said bed of polymer particles, and recovering said reflected radar pulse at said guided wave radar probe unit.

2. The method of claim 1 wherein the time difference between the initiation of said first radar pulse and the return of said reflected radar pulse is converted to a distance from which said upper surface level of said bed of polymer particles is calculated.

3. The method of claim 1 wherein said polymer particles are composed at least in part of polyethylene.

4. The method of claim 1 wherein said polymer particles are composed at least in part of high density polyethylene.

5. The method of claim 1 wherein said elongate rigid radar inactive member is of a length sufficient to prevent lateral impacting of said radar active probes with said incoming polymer particles.

* * * * *